Sept. 27, 1927.
W. E. H. BELL
1,643,365
FASTENING MECHANISM
Original Filed Nov. 20, 1924   3 Sheets-Sheet 2
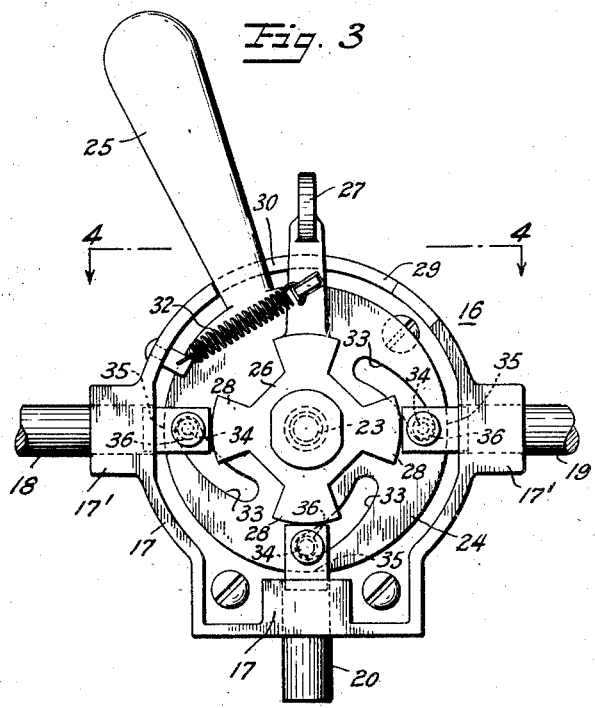
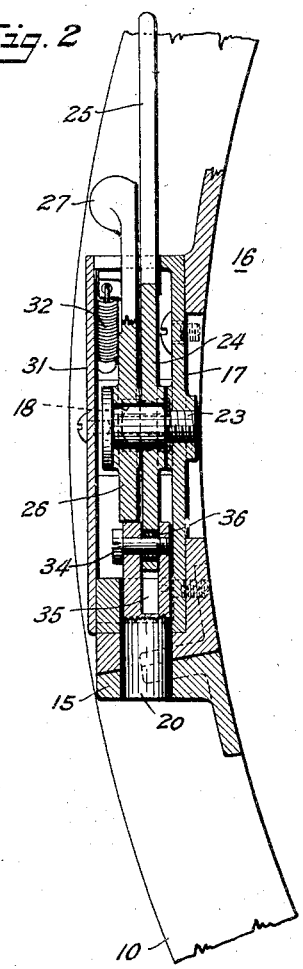
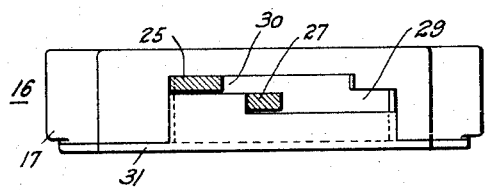
INVENTOR
William E. H. Bell
BY
Duell Anderson & Duell
ATTORNEYS

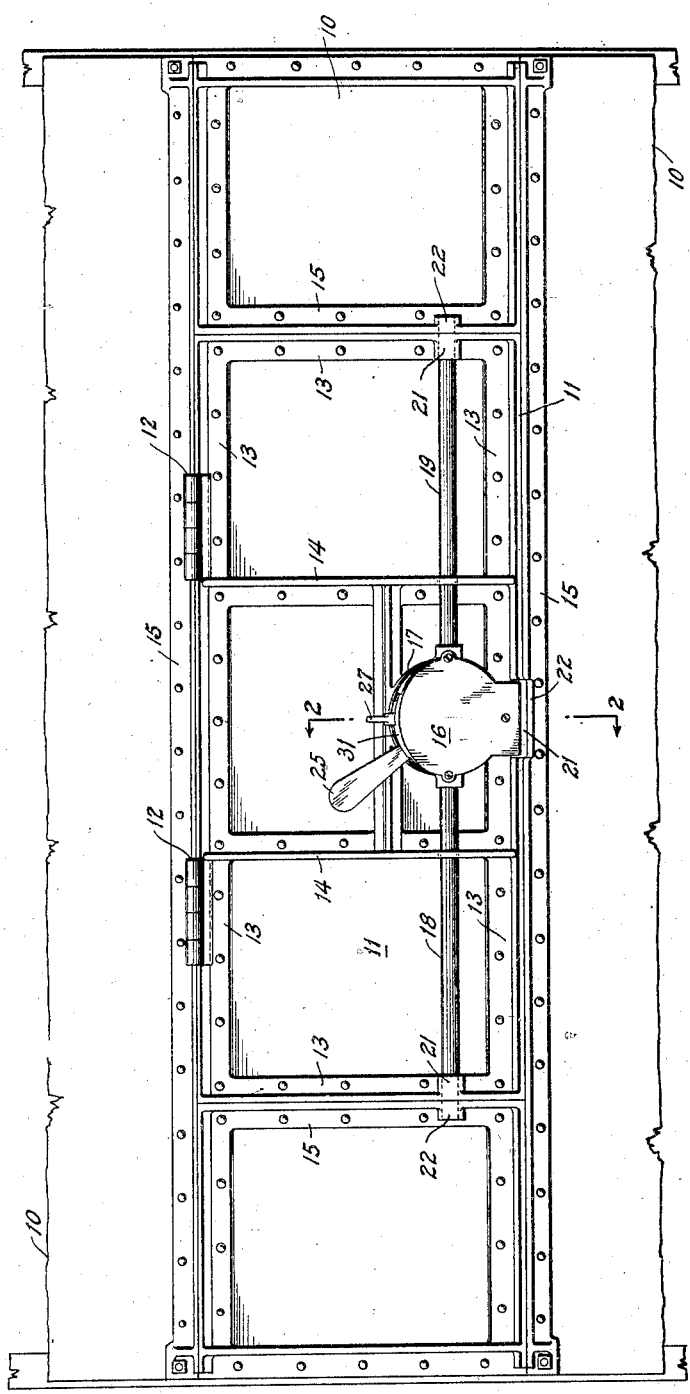

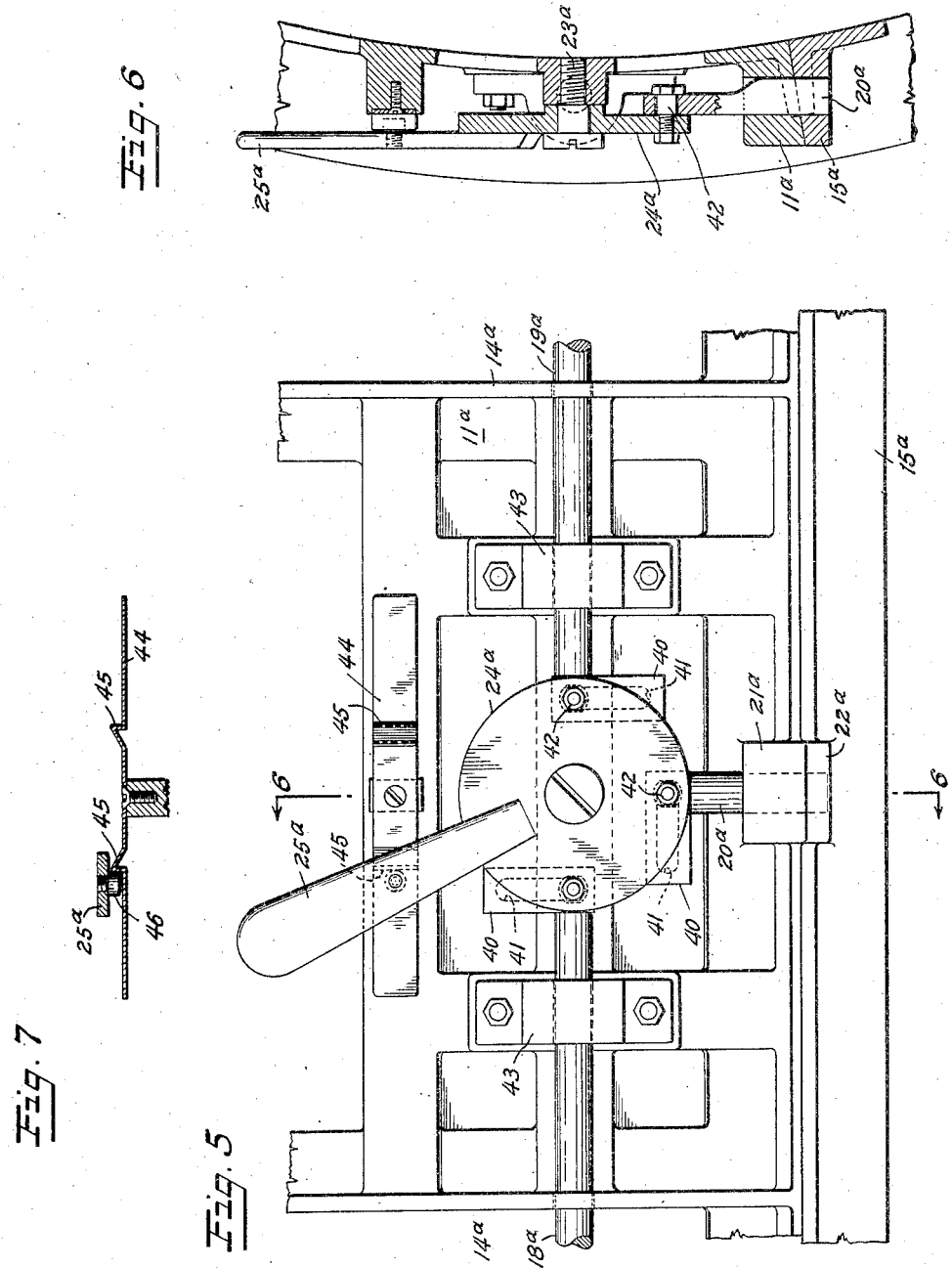

Patented Sept. 27, 1927.

1,643,365

UNITED STATES PATENT OFFICE.

WILLIAM E. H. BELL, OF GLENSIDE, PENNSYLVANIA, ASSIGNOR, BY MESNE ASSIGNMENTS, TO H. W. BUTTERWORTH & SONS COMPANY, A CORPORATION OF PENNSYLVANIA.

FASTENING MECHANISM.

Application filed November 20, 1924, Serial No. 750,985. Renewed July 1, 1927.

This invention relates to improvements in fastening mechanisms, and more particularly in some of its details to improvements in plural bolt fastening mechanisms particularly adapted for fastening closures of cylindrical receivers for dyeing machines or the like.

It is a general object of the invention to provide an improved and perfected fastening mechanism of the class mentioned which is simple in nature and susceptible of easy operation to hold closures or the like firmly in closed position.

A more particular object of the invention is to provide an improved fastening mechanism for heavy duty in connection with closures for cylindrical receivers of dyeing machines or the like.

A further object is to provide an improved fastening mechanism of the class mentioned which is provided with a simple, durable and satisfactory securing arrangement, operating automatically for securing the fastening mechanism in securing position.

Another object is to provide an improved plural bolt fastening mechanism for closures, being adapted to support the closure in closed position at a plurality of points, preventing springing of the closure away from the closure jamb, and being simultaneously operable by an improved operating mechanism automatically held in fastening position.

Other objects will be in part obvious in connection with the following detailed description, and in part pointed out therein.

The invention accordingly comprises the features of construction, combinations of elements, and arrangement of parts, and which will be exemplified in the construction hereinafter set forth and the scope of the application of which will be indicated in the claims.

For a more complete understanding of the nature and objects of the invention reference is had to the following detailed description and to the accompanying drawings disclosing certain preferred embodiments of the invention, and in which:

Figure 1 is a plan view of a fastening mechanism embodying the invention as applied to a tank or cylindrical drum receiver for dyeing machines and the like;

Fig. 2 is an enlarged section taken approximately on the line 2—2 of Fig. 1;

Fig. 3 is an enlarged, fragmentary plan view of the fastening mechanism, the cover plate being removed;

Fig. 4 is a sectional elevation taken on the line 4—4 of Fig. 3;

Fig. 5 is a fragmentary plan view similar to Fig. 1, but disclosing a modification of the invention;

Fig. 6 is a section on the lines 6—6 of Fig. 5; and

Fig. 7 is a fragmentary section on the line 7—7 of Fig. 5 showing the spring locking plate.

Referring to the drawing for a detailed description of the invention and first to the embodiment thereof disclosed in Figs. 1 to 4 inclusive, a fragment of a metallic cylindrical tank or receiver is shown at 10 being fitted with a closure or door 11 hinged at 12 to close an opening leading through the walls of the tank through which material may be loaded or unloaded. The door is preferably metallic and formed with marginal ribs 13 extending along the transverse and longitudinal edges of the door and transverse stiffening ribs 14. The tank walls are reinforced at the margins of the opening with ribs forming door jambs 15 having, as shown in Fig. 2, inclined faces co-operating with complementary inclined faces on the door edges so the door may be forced into position to form a tight wedging joint with the jamb.

The fastening mechanism shown generally at 16 is of the plural bolt type including a casing or base 17 removably mounted upon the outer face of the door, and being provided with supports 17' for slidably mounting the fastening bolts 18, 19 and 20. The bolt 20 as shown is mounted at the side edge of the door while bolts 18 and 19 extend to opposite ends thereof being mounted for guidance in the transverse ribs 14. The fastening bolts are arranged to be projected and retracted to cooperate with apertures or keepers provided in integral formations 21 and 22 on the ribs 13 and 15 respectively, these apertures being brought into alignment when the doors are forced into closed position.

The casing 17 has a central stud 23 upon which are mounted for rotation a bolt operating cam or shifter plate 24 provided with an operating handle 25, and a bolt fastening plate 26 provided with an operating handle 27. The bolt fastening plate 26 is provided with holding lugs 28 disposed for cooperation with complementary lugs on the fastening bolts. As shown, lugs 28 have arcuate faces abutting against lugs provided by the inner ends of the bolts. The handles 25 and 27 extend through slots 29 and 30 formed in the casing 17 and the cooperating cover plate 31, the latter being removably mounted upon the casing, and a tension spring 32 is anchored to the casing and to the bolt fastening plate 26 to urge the latter to bolt fastening position.

The shifter plate 24 is provided with cam lugs for retracting and projecting the bolts, these lugs being provided as shown by radially inclined slots 33 for the reception of lugs 34 at the inner ends of the bolts. The lugs 34 as shown are preferably provided by means of screws extending through the inner ends of the bolts which are slotted at 35 to receive the cam plate. Cam rollers 36 may be provided to receive the thrust between the cam plates and bolts and to reduce friction therebetween.

The operation of the embodiment of the invention above described will now be clearly understood and may be summarized as follows:

Referring particularly to Fig. 3, it will be seen that all three bolts are in projecting or fastening position and are secured there by engagement of the lugs 28 of the fastening plate 26 with the inner ends of the bolts, the fastening plate being held in fastening position by means of the spring 32. When it is desired to retract the bolts in fastening the door, the fastening plate 26 is first moved against the tension of spring 32 in a clockwise direction by means of the handle 27 to bring the lugs 28 from alignment with the fastening bolts, whereupon the handle 25 is moved, also in a clockwise direction, to move the shifter plate 24, thus retracting all three bolts together through operation of the cam slots 33 and the cooperating lugs on the bolts. The fastening plate 26 is retained in unfastening position against the tension of spring 32 by the inner ends of the bolts which contact at the sides thereof with the sides of the lugs 28. When it is desired again to project the bolts, the cam plate is rotated in the reverse direction, that is counter-clockwise, the bolts being thus projected, and the bolt fastening plate 26 being automatically moved under the influence of spring 32 to fastening position as the bolts advance to clear the contacting sides of the lugs 28, the bolts then assuming the position shown in Fig. 3. The door is thus securely fastened in closed position at a plurality of points so as to effectually support loads from within, and avoid warping. The bolts and the cooperating keepers may be formed at their fastening ends with inclined faces so as to effect a wedging action to force the door in closed position.

The modification of the invention disclosed in Figs. 5, 6 and 7 is similar in many respects to that already described, and the corresponding parts are indicated in the drawing by the same reference numeral with the addition of the index $a$. In this embodiment the bolt fastening plate 26 is omitted, the bolts being held in both projected and retracted positions by means of a modified fastening mechanism, but the door and jamb constructions are similar and the bolts $18^a$, $19^a$ and $20^a$ are operated by a shifter plate $24^a$ mounted for rotation on a stud $23^a$. In this instance the bolts are provided at their inner ends with laterally extending lugs 40 having slots 41 disposed transversely of the bolt and cooperating with lugs 42 secured to the shifter plate $24^a$. The opposed bolts $18^a$ and $19^a$ are held for longitudinal movement in bearings 43 and the bolt $20^a$ is similarly mounted in an apertured boss $21^a$ preferably made integral with the door. Bolt $20^a$ cooperates with an aperture formed in the boss $21^a$ and a similar opening formed in the boss $22^a$ of the door frame, the arrangement being similar to that of the integral formations or bosses 21 and 22 described above. It will furthermore be understood that the bolts $18^a$ and $19^a$ cooperate with keepers or apertures at the fastening ends in a manner similar to that described above.

For holding the shifter plate $24^a$ in either bolt-projecting or bolt-retracting positions, a fastening plate 44 of spring metal is secured to the door having lugs 45 projecting from the upper face thereof for cooperation with a lug 46 on the underside of the handle $25^a$. The lugs 45 are formed at their outer faces with abrupt abutments for cooperation with the lug 46 but are included on their inner faces so the lug 46 may ride thereover, forcing the spring plate downwardly. When it is desired to release the handle from the position shown in Fig. 7, the spring plate is pressed downwardly moving the lug 45 from engagement with lug 46, whereupon the handle may be swung to the right in Fig. 4 to retract the fastening bolts.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statement of the scope of the invention which, as a matter of language, might be said to fall therebetween.

Having described my invention, what I claim as new and desire to secure by Letters Patent, is:

1. In a fastening mechanism, in combination, a plurality of bolts for fastening a closure in closed position, operating means for moving said bolts to and from fastening position, and locking means for holding said bolts in fastening position independently of said bolt operating means.

2. In a fastening mechanism, in combination, a plurality of bolts for fastening a closure in closed position, common operating means for simultaneously operating said bolts, and a rotary fastening member having lugs cooperating individually with said bolts to hold them in fastening position.

3. In a fastening mechanism, in combination, a plurality of bolts for fastening a closure in closed position, common operating means including operating cams cooperating with said bolts to move them toward or from fastening position and an independently operable rotary fastening member having lugs cooperating to hold said bolts in fastening position.

4. In a fastening mechanism, in combination, a plurality of bolts for fastening a closure in closed position, common operating means for simultaneously operating said bolts, and a rotary fastening member having lugs cooperating individually with said bolts to hold them in fastening position, said fastening member being automatically movable into fastening position upon operation of the operating means.

5. In a fastening mechanism, in combination, a plurality of bolts for fastening a closure in closed position, common operating means including operating cams cooperating with said bolts to move them toward or from fastening position, and an independently operable rotary fastening member having lugs cooperating to hold said bolts in fastening position, said fastening member being automatically movable into fastening position upon operation of the operating means.

6. In a fastening mechanism, in combination, a plurality of bolts for fastening a closure in closed position, a rotary shifter plate for simultaneously operating said bolts, bolt operating connections between the bolts and shifter plate for projecting or retracting the bolts upon movement of the shifter plates in opposite directions, and a rotary bolt fastening member mounted concentrically with said shifter plate and having lugs cooperating to hold the bolts in fastening position.

7. In a fastening mechanism, in combination, a plurality of bolts for fastening a closure in closed position, a rotary shifter plate for simultaneously operating said bolts, bolt operating connections between the bolts and shifter plate for projecting or retracting the bolts upon movement of the shifter plates in opposite directions, a rotary bolt fastening member mounted concentrically with said shifter plate and having lugs cooperating to hold the bolts in fastening position, said lugs contacting with the bolts when retracted to hold the bolt fastening member in unfastening position, and a spring connected to said bolt fastening member to move it automatically to fastening position upon projection of the bolts into fastening position.

8. In a fastening mechanism, in combination, a plurality of bolts for fastening a closure in closed position, a rotary shifter plate for simultaneousously operating said bolts, bolt operating connections between the bolts and shifter plate for projecting or retracting the bolts upon movement of the shifter plates in opposite directions, a handle for operating said shifter plate, and a spring pressed plate cooperating to hold the bolts in fastening position.

9. In a fastening mechanism, in combination, a plurality of bolts for fastening a closure in closed position, operating means for moving said bolts to and from fastening position, fastening means for holding said bolts in fastening position independently of said bolt operating means, and means for automatically operating said bolt fastening means to fasten said bolts when the latter are projected into closure fastening position.

10. In a fastening mechanism, in combination, a plurality of bolts for fastening the closure in closed position, operating means for moving said bolts to and from fastening position, and a fastening device for fastening said bolts in closure fastening position, said bolt fastening device including lugs adapted to cooperate with the bolts and being movable to and form bolt fastening positions.

11. In a fastening mechanism, in combination, a plurality of bolts for fastening a closure in closed position, a rotary shifter plate for said bolts, a pin and slot connection between said shifter plate and each of said bolts, a rotary bolt fastening plate having lugs for cooperation with said bolts to hold them in position, and means to automatically operate said bolt fastening plate when the bolts are moved into fastening position.

In testimony whereof I affix my signature.

WILLIAM E. H. BELL.